(12) United States Patent
Sharfi et al.

(10) Patent No.: US 12,488,914 B2
(45) Date of Patent: Dec. 2, 2025

(54) HIGH-SPEED INPUT/OUTPUT AND HIGH-POWER TRANSMISSION CONNECTOR AND CABLE

(71) Applicants: Benjamin K. Sharfi, Rancho Cucamonga, CA (US); Cory Steen, Rancho Cucamonga, CA (US); Saul Gonzalez, Rancho Cucamonga, CA (US); Kadek W. Hemawan, Rancho Cucamonga, CA (US)

(72) Inventors: Benjamin K. Sharfi, Rancho Cucamonga, CA (US); Cory Steen, Rancho Cucamonga, CA (US); Saul Gonzalez, Rancho Cucamonga, CA (US); Kadek W. Hemawan, Rancho Cucamonga, CA (US)

(73) Assignee: Benjamin K. Sharfi, Rancho Cucamonga, CA (US)

( * ) Notice: Subject to any disclaimer, the term of this patent is extended or adjusted under 35 U.S.C. 154(b) by 193 days.

(21) Appl. No.: 18/332,976

(22) Filed: Jun. 12, 2023

(65) Prior Publication Data

US 2023/0402207 A1 Dec. 14, 2023

Related U.S. Application Data

(60) Provisional application No. 63/366,160, filed on Jun. 10, 2022.

(51) Int. Cl.
*H01B 11/22* (2006.01)
*H01B 7/40* (2006.01)
(Continued)

(52) U.S. Cl.
CPC ............... *H01B 11/22* (2013.01); *H01B 7/40* (2013.01); *H01B 7/228* (2013.01); *H01B 7/2813* (2013.01)

(58) Field of Classification Search
None
See application file for complete search history.

(56) References Cited

U.S. PATENT DOCUMENTS 8,579,519 B2 11/2013 Wu
2003/0228791 A1 12/2003 Milan
(Continued)

OTHER PUBLICATIONS

PCT Patent Application No. PCT/US23/68277—Patent Cooperation Treaty PCT Written Opinion of the International Searching Authority—Completed Oct. 27, 2023 (mailed Nov. 20, 2023).
(Continued)

*Primary Examiner* — Chad H Smith
(74) *Attorney, Agent, or Firm* — Lott & Fischer, PL

(57) ABSTRACT

An interconnection cable adapted to connect two or more electronic devices comprising one or more end connectors; at least one of the one or more connectors comprising one or more data plugs, each complying with the USB or the Thunderbolt specification, and one or more power pins that are separate from the data plug; a cable assembly attached to at least one of the one or more connectors; the cable assembly comprising one or more fiber optic cores, and one or more stranded coper wires; wherein at least one of the one or more fiber optic cores is communicatively connected to at least one of the one or more data plugs; and wherein at least one of the one or more stranded copper wires is electrically connected to at least one of the one or more power pins.

7 Claims, 4 Drawing Sheets

(51) Int. Cl.
   *H01B 7/22*   (2006.01)
   *H01B 7/28*   (2006.01)

(56) References Cited

U.S. PATENT DOCUMENTS

| | | | |
|---|---|---|---|
| 2007/0014522 A1* | 1/2007 | Yamaguchi | G02B 6/3817 385/100 |
| 2009/0215320 A1* | 8/2009 | Iranpour Feridani | H01R 27/00 439/660 |
| 2012/0141132 A1 | 6/2012 | Walker | |
| 2012/0178303 A1 | 7/2012 | Sakurai | |
| 2012/0183262 A1 | 7/2012 | Schwandt et al. | |
| 2016/0131860 A1 | 5/2016 | Tong et al. | |
| 2017/0068061 A1 | 3/2017 | Yang et al. | |
| 2018/0102605 A1 | 4/2018 | Patton et al. | |
| 2019/0356090 A1 | 11/2019 | Lei et al. | |

OTHER PUBLICATIONS

PCT Patent Application No. PCT/US23/68277—Patent Cooperation Treaty PCT International Search Report of the International Searching Authority—Completed Oct. 27, 2023 (mailed Nov. 20, 2023).

Poweredusb.org an informational website—Retail USB—USB Plus—Power USB—USB+POWER / Electro-mechanical Specification—Version 0.8g / 2005 /1-33 pgs.

European Patent Application No. 23820715.3—European Search report and Opinion completed Aug. 26, 2025 (mailed Sep. 9, 2025).

\* cited by examiner

HIGH-SPEED INPUT/OUTPUT AND HIGH-POWER TRANSMISSION CONNECTOR AND CABLE

CLAIM OF PRIORITY

This application is being filed as a non-provisional patent application under 35 U.S.C. § 111(a) and 37 CFR § 1.53(b). This application claims priority under 35 U.S.C. § 119(e) to U.S. provisional patent application Ser. No. 63/366,160 filed on Jun. 10, 2022, the contents of which are incorporated herein by reference.

FIELD OF INVENTION

The present invention relates to interconnection equipment in the field of electronic components. More specifically, the present invention relates to high-speed input/output signal and high-power transmission connectors and cables.

SUMMARY OF THE INVENTION

Disclosed is a connector and cable for use in applications requiring high-speed input/output ("I/O") signal and high-power transmission signals up to 100 meters under the universal serial bus version 4.0 (or greater) ("USB4") or thunderbolt 4 (or greater) ("TBT4") specifications, in combination with fiber optic transmission media, including for computer electronic applications. The optical fiber and power signal cable and connectors are combined in a single-cable design, sealed, smaller form factor, and ruggedized for harsh and extreme environments.

This invention allows for the transmission of high-speed data and high-power signals in a single cable-connector assembly, without requiring an external power source being connected separately. Furthermore, it enables the placement of electronic device modules 100 meters (or greater) from the host computer with a data transmission rate of 100 Gb/s. The disclosed cable connector technology with 100 Gigabit Ethernet ("GbE") data capability, and power signal transmission, using the USB4/TBT4 specifications and in combination with fiber-optics media is novel in the field of technology. The disclosed device is more economical and efficient than existing cable/connector combinations.

Features of the disclosed cable/connector are as follows: (1) USB4 or TBT4 ports with up to 40 Gb/s transfer rate per port, (2) power delivery provides up to 100 W (20V@5 A) for each port, (3) an embedded system controller ("ESC") for full system health monitoring and reporting, (4) size optimized for use on Virtual Path Cross-Connect ("VPX") or Versa Module Eurocard ("VME") 1 U rack mount form factors, or stand-alone systems, (5) over 360 Gb/S external I/O throughputs.

DETAILED DESCRIPTION OF THE INVENTION

Following is a detailed descriptions of several aspects of the present invention, all of which relate to the high-speed input/output signal and high-power transmission connectors and cables in accordance with embodiments of the present invention.

Figure 1:
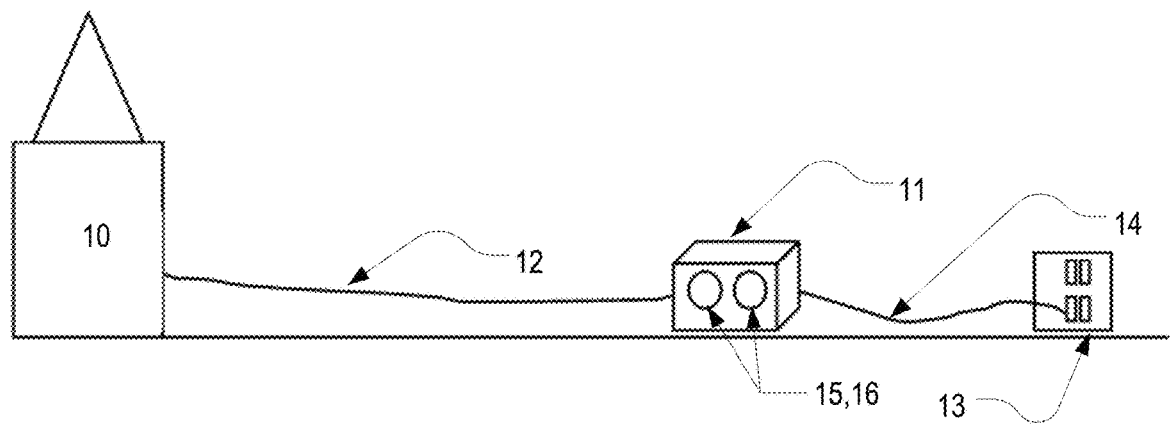
FIG. 1 shows a schematic diagram for data signal and power transmission between a host and a system device, using fiber optics over USB4/TBT4 and an external power source in accordance with the prior art.

FIG. 1 shows a schematic diagram for data signal and power transmission between a host and a system device, using fiber optics over USB4/TBT4 and an external power source in accordance with the prior art. As shown a host (10) is connected to a system device (11) using a standard fiber optic USB4/TBT4 cable (12) requires the use of an external power source (13), and an external power cable (14). In addition to the external power source (13) and external power cable (14), two separate connectors (15, 16) are required in the system device (11) to accommodate the configuration.

Figure 2:
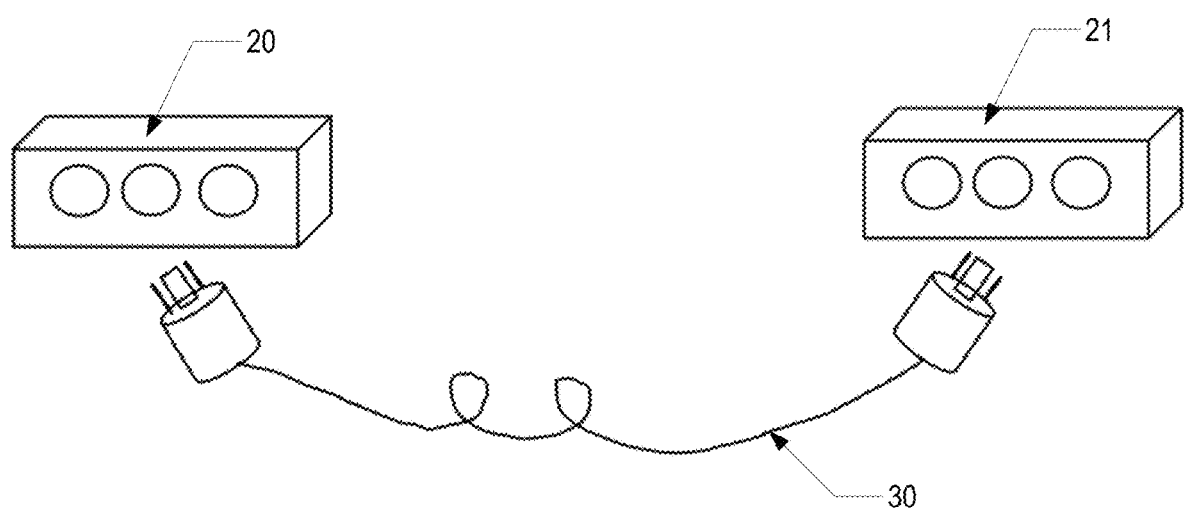
FIG. 2 shows a schematic diagram for data signal and power transmission between a host and a system device, using fiber optics over USB4/TBT4 without requiring an external power source in accordance with an embodiment of the present invention.

FIG. 2 shows a schematic diagram for data signal and power transmission between a host and a system device, using fiber optics over USB4/TBT4 without requiring an external power source in accordance with an embodiment of the present invention. As shown, As shown a host (20) is connected to a system device (21) using only a combined high-speed I/O signal and high-power transmission connectors and cable (30) in accordance with an embodiment of the present invention. No separate external power source or external power cable are required. Moreover, due to the efficient design of the cable design under the present invention, only a single connector (22) is required in the system device (21) to accommodate the configuration.

Figure 3:
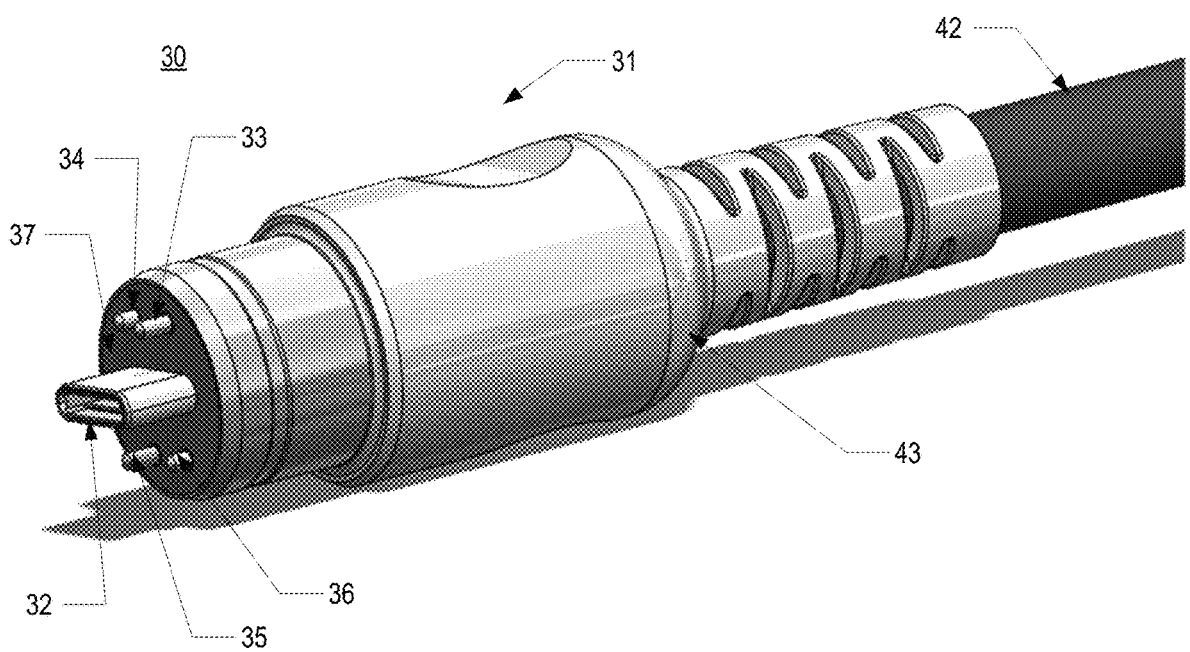
FIG. 3 shows a perspective view representation of an assembled connector and cable in accordance with an embodiment of the present invention.
Figure 4:
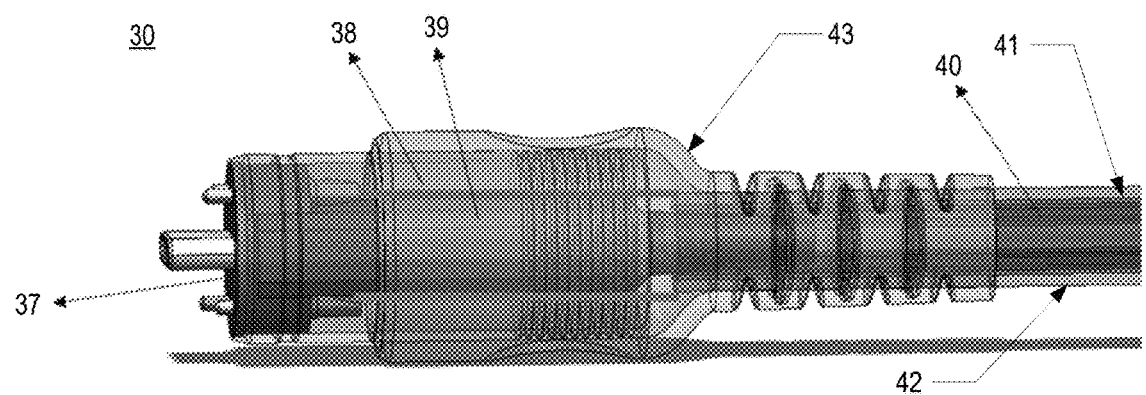
FIG. 4 shows a partially transparent side view representation of an assembled connector and cable in accordance with an embodiment of the present invention.

FIGS. 3 and 4 show perspective and side view representations of an assembled connector and cable (30) in accordance with an embodiment of the present invention. FIG. 4 is partially transparent to illustrate interior features not normally observable. As shown, cable (30) comprises a connector (31) with an I/O male (shown) or female (not shown) plug (32) in accordance with the USB4 or TBT4 specifications. The connector (31) further includes 4 or more power pins (33, 34, 35, 36) which are adapted to the requirements of the system device (21) to be connected to the host (20). In one embodiment there may be one or more power transmission pins (33, 34), a power management ("PM") bus clock signal pin (35), and a PM bus data pin (36). In the embodiment shown, the power pins (33, 34, 35, 36) are configured as spring-loaded, or "pogo" pins. However, other pin designs that are well known in the art may be utilized, alone or in combination with pogo pins, for the power pins. The power pins may be male, as shown, or female (not shown).

The plug (32), and power pins (33, 34, 35, 36), are retained by a shield housing (37) which in the shown embodiment is circular but can be of any suitable shape. The power pins (33, 34, 35, 36) are commonly connected to stranded copper wires (38) of a gauge appropriate for the application. The plug (32) is connected to a data-transmission medium comprising one or more fiber optic cores (40). The plug may also be optionally connected to one or more stranded coper wires (38) in accordance with the applicable USB4 or TBT4 specifications. The connector (31) also includes a printed circuit board ("PCB") module (39) that is adapted to manage the transmission of data and/or power in accordance with the appropriate specification (i.e., USB4 or TBT4). For shielding purposes, a braided weaved wire layer (41) may encase the above-referenced stranded coper wires and fiber-optic cores, with the complete cable being further encased by an insulation layer (42). Finally, for mechanical and electrical protection, connector (31) comprises an overmolded insulation housing (43).

Figure 5:
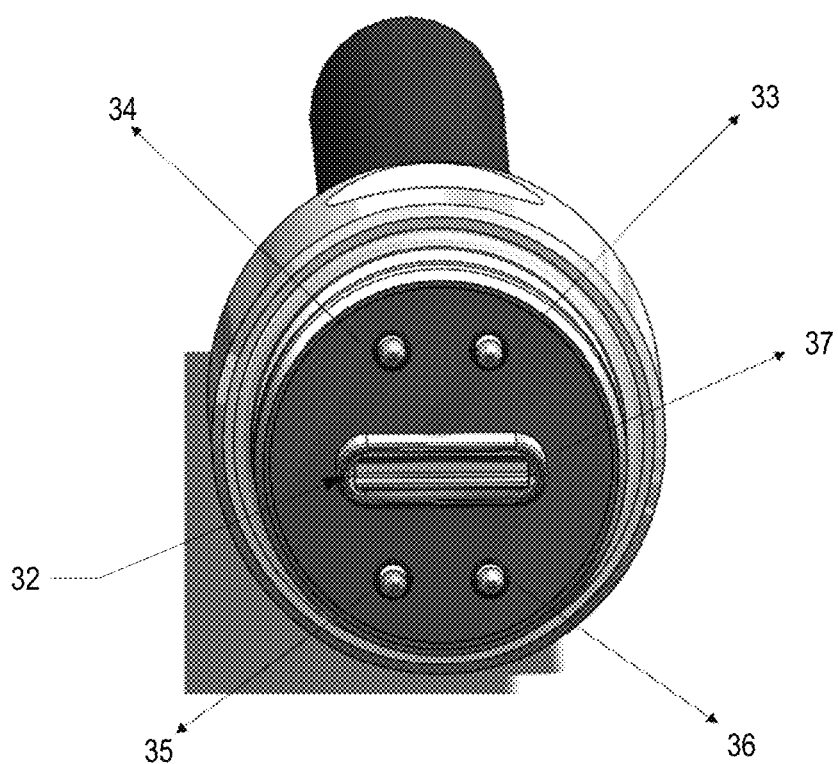
FIG. 5 shows a frontal view representation of a connector illustrating the pin layout in accordance with an embodiment of the present invention.

FIG. 5 shows a frontal view representation of a connector illustrating the pin layout in accordance with an embodiment of the present invention. Shown are the plug (32), and power pins (33, 34, 35, 36), as retained within circular shield housing (37).

Figure 6:
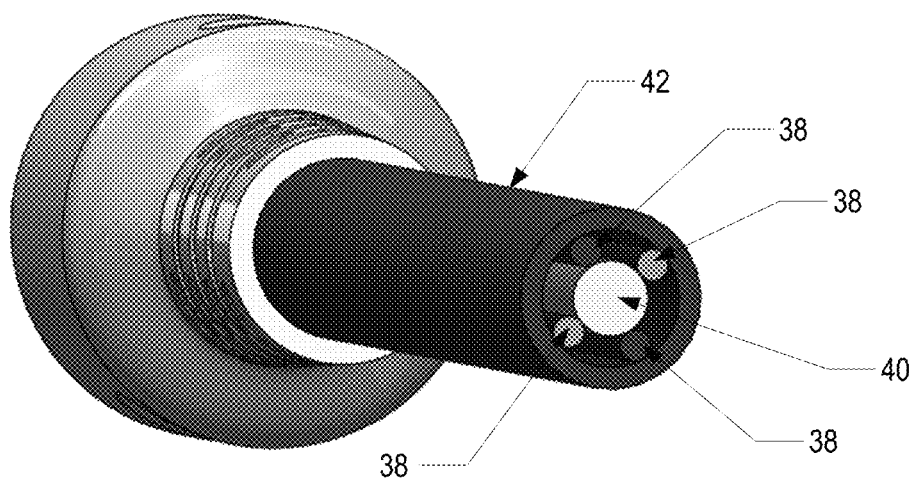
FIG. 6 shows a rear perspective view representation of a connector in accordance with the present invention including a cross sectional view of the cable to illustrate the arrangement the power conductors and fiber-optic core in accordance with an embodiment of the present invention.

FIG. 6 shows a rear perspective view representation of a connector in accordance with the present invention including a cross sectional view of the cable to illustrate the arrangement the power conductors and fiber-optic core in accordance with an embodiment of the present invention. Shown are stranded copper wires (38) and fiber optic core (40) in a possible arrangement, all encased by an insulation layer. Note that the braided weaved wire layer (41), and additional stranded copper wires (38) and fiber optic cores (40) are not shown in FIG. 6 for purposes of simplification.

Figure 7:
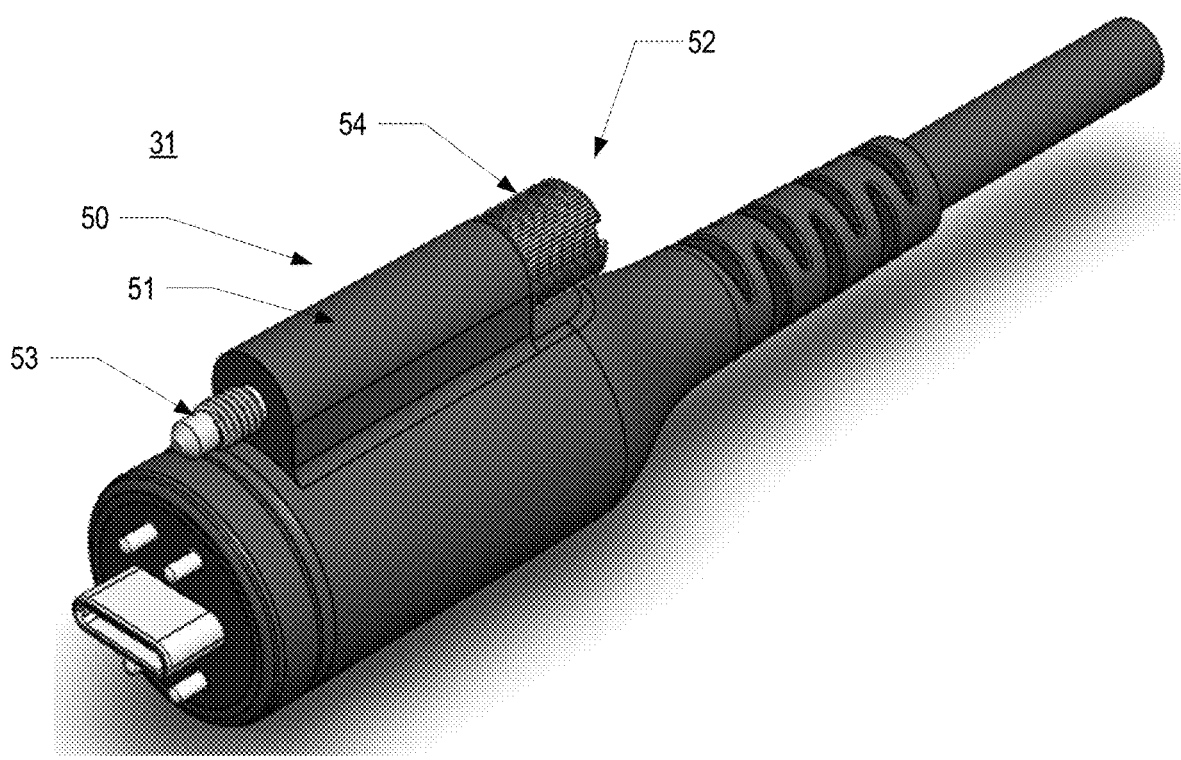
FIGS. 7 and 8 show different views of a connector with a retainer in accordance with an embodiment of the present invention.
Figure 8:
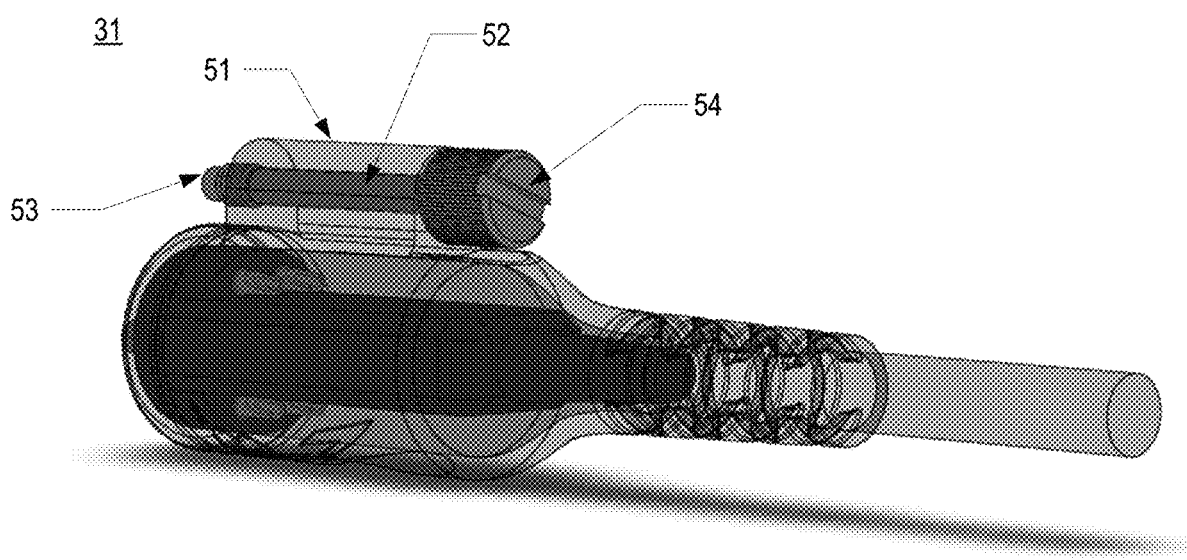

FIGS. 7 and 8 show different views of a connector (31) with a built-in retainer (50), in accordance with an embodiment of the present invention. FIG. 8 is partially transparent to illustrate interior features not normally observable. The retainer (50) in the shown embodiment comprises a barrel (51) attached to, or integral with, connector (31), having a longitudinal opening adapted to accept a retaining screw (52) therethrough. The retaining screw has a threaded end (53) and a head (54), the head optionally adapted to accept a fastening tool, such as a screwdriver, and/or optionally adapted for hand fastening. The threaded end (53) of the screw is adapted to engage a threaded opening (not shown) on the host (20) and/or system device (21) to ensure positive locking of the connector to the host or system device.

Although described above in connection with particular hardware configurations and standards, these descriptions are not intended to be limiting as various modifications may be made therein without departing from the spirit of the invention and within the scope and range of equivalent of the described embodiments. Encompassed embodiments of the present invention can be used in all applications where efficient and high-performing electronic device interconnections are desired.

While a number of embodiments of the present invention have been described, it is understood that these embodiments are illustrative only, and not restrictive, and that many modifications may become apparent to those of ordinary skill in the art. For example, any element described herein may be provided in any desired size (e.g., any element described herein may be provided in any desired custom size or any element described herein may be provided in any desired size selected from a "family" of sizes, such as small, medium, large). Further, one or more of the components may be made from any suitable material.

In addition, various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. An interconnection cable adapted to connect two or more electronic devices comprising:
   one or more end connectors;
   at least one of the one or more connectors comprising one or more data plugs, each data plug complying with a USB specification, and one or more power pins that are separate from the data plug;
   a cable assembly attached to at least one of the one or more connectors;
   the cable assembly comprising one or more fiber optic cores, and one or more stranded copper wires;
   wherein at least one of the one or more fiber optic cores is communicatively connected to at least one of the one or more data plugs;
   wherein at least one of the one or more stranded copper wires is electrically connected to at least one of the one or more power pins; and
   wherein at least one of the one or more the power pins is a pogo or spring-loaded pin.

2. The interconnection cable of claim 1 wherein at least one of the one or more data plugs is male.

3. The interconnection cable of claim 1 wherein at least one of the one or more data plugs is female.

4. The interconnection cable of claim 1 wherein at least one of the one or more power pins is male.

5. The interconnection cable of claim 1 wherein at least one of the one or more power pins is female.

6. The interconnection cable of claim 1 wherein the cable assembly is shielded.

7. The interconnection cable of claim 1 further comprising a retainer adapted to positively engage at least one of the two or more electronic devices.

* * * * *